(12) United States Patent
Parraga

(10) Patent No.: US 7,627,397 B2
(45) Date of Patent: Dec. 1, 2009

(54) MATERIAL-SENSITIVE ROUTING FOR SHARED CONDUIT SYSTEMS

(75) Inventor: John R. Parraga, Anthem, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 194 days.

(21) Appl. No.: 11/864,697

(22) Filed: Sep. 28, 2007

(65) Prior Publication Data

US 2009/0088905 A1    Apr. 2, 2009

(51) Int. Cl.
G05D 7/00 (2006.01)
G05D 11/00 (2006.01)
G06F 19/00 (2006.01)

(52) U.S. Cl. .................. 700/282; 700/240; 700/241; 700/242; 700/283; 700/289; 73/1.16; 137/2; 137/3

(58) Field of Classification Search ......... 700/239–242, 700/275, 282–283, 289; 73/1.16, 1.24, 1.34; 137/2–3
See application file for complete search history.

(56) References Cited

U.S. PATENT DOCUMENTS

| | | | | |
|---|---|---|---|---|
| 3,854,778 | A * | 12/1974 | Trythall | 406/3 |
| 4,202,180 | A * | 5/1980 | Cox | 62/48.1 |
| 5,140,516 | A * | 8/1992 | Rainville | 700/11 |
| 5,437,299 | A * | 8/1995 | Kolpak | 137/1 |
| 6,220,790 | B1 * | 4/2001 | Schenk et al. | 406/3 |
| 6,221,226 | B1 * | 4/2001 | Kopf-Sill | 204/602 |
| 6,615,861 | B2 * | 9/2003 | Drube et al. | 137/208 |
| 6,691,939 | B2 * | 2/2004 | Grimes | 241/46.17 |
| 2004/0248307 | A1* | 12/2004 | Grof et al. | 436/56 |
| 2005/0059846 | A1* | 3/2005 | Kohda et al. | 585/15 |
| 2005/0095859 | A1* | 5/2005 | Chen et al. | 438/689 |

* cited by examiner

Primary Examiner—Ramesh B Patel
(74) Attorney, Agent, or Firm—Boyle Fredrickson LLP; William R. Walbrun

(57) ABSTRACT

A routing system for shared conduits used in industrial applications is sensitive to material types and material flow histories to allow compatible materials to flow through shared conduits without cleaning while preventing contamination of materials in those shared conduits.

11 Claims, 5 Drawing Sheets

FIG. 6

PRODUCT A AND PRODUCT B COMPATIBILITY TABLE

70

|  |  | MATERIAL A (UPSTREAM MATERIAL) | | | | | | | | | | |
|---|---|---|---|---|---|---|---|---|---|---|---|---|
| PRODUCT NAME | | 1 | 2 | 3 | 4 | 5 | 6 | 7 | 8 | 9 | 10 | n |
| PRODUCT1 (CLEAN) | 1 | Y | Y | Y | Y | Y | Y | Y | Y | Y | Y | Y |
| PRODUCT2 (CIP) | 2 | Y | Y | N | N | N | N | N | N | N | N | N |
| PRODUCT3 | 3 | Y | N | Y | Y | Y | Y | N | N | N | N | N |
| PRODUCT4 | 4 | Y | N | Y | Y | Y | Y | N | N | N | N | N |
| PRODUCT5 | 5 | Y | N | Y | Y | Y | Y | N | N | N | N | N |
| PRODUCT6 | 6 | Y | N | Y | Y | Y | Y | Y | Y | Y | Y | Y |
| PRODUCT7 | 7 | Y | N | Y | Y | Y | Y | Y | Y | Y | Y | Y |
| PRODUCT8 | 8 | Y | N | Y | Y | Y | N | Y | Y | Y | Y | Y |
| PRODUCT9 | 9 | Y | N | Y | Y | Y | Y | Y | Y | Y | Y | Y |
| PRODUCT10 | 10 | Y | N | Y | Y | Y | Y | Y | Y | Y | Y | Y |
| PRODUCT...n | n | Y | N | Y | Y | Y | Y | Y | Y | Y | Y | Y |

MATERIAL B (DOWN STREAM MATERIAL)

| EXAMPLE MATERIAL 1 | CLEAN PIPE |
| EXAMPLE MATERIAL 2 | CIP MATERIAL |
| EXAMPLE MATERIAL 1-6 | DARK COLOR |
| EXAMPLE MATERIAL 7-10 | LIGHT COLOR |

MATERIAL-SENSITIVE ROUTING FOR SHARED CONDUIT SYSTEMS

CROSS-REFERENCE TO RELATED APPLICATIONS

Not applicable

STATEMENT REGARDING FEDERALLY SPONSORED RESEARCH OR DEVELOPMENT

Not applicable

BACKGROUND OF THE INVENTION

The present invention relates generally to industrial control systems and, more particularly, to systems and methods for facilitating movement of materials.

BACKGROUND

Integrated manufacturing operations involve high-complexity manufacturing processes. Such processes are involved in many areas of modern production. These areas include substantially any type of packaged products that are commonly found in grocery stores or other distribution outlets. For example, these products include beverages, flour, boxed items such as cereals, shampoo, liquid soaps, fertilizers, and so forth. Often, complex factory equipment arrangements and programming are provided to produce all or portions of such products.

Production often involves the movement of materials through a series of production equipment. For example, in a beverage manufacturing operation, liquid materials including different types of beverages can be moved from a set of storage tanks to a filling station that can include multiple filling lines or bottling equipment for filling bottles, cans or other product packages. The beverages can be transported through a set of pipes connecting the storage tanks to the filling equipment. Typically, a shared network of interconnected pipes joined by valves is used so that each storage tank may communicate with each filling station, allowing great flexibility in pairing storage tanks and filling stations while avoiding the prohibitive cost of dedicated lines between each storage tank and each filling station. Header valves are arranged in an array providing a pass from each storage tank to one of a set of shared pipes. Similar valves join each of the filling stations to the shared pipes. By properly switching the sets of valves, material can be routed flexibly from any individual storage tank to any individual filling station. Further mixing operations can be conducted by routing multiple storage tanks to an individual filling station.

A manufacturing operation can include hundreds of storage tanks, dozens of filling lines and multiple pipes connecting the storage tanks to the filling lines. Coordinating the flow of different beverage types by controlling both sets of valves can be complex.

Movement of materials from multiple sources to multiple destinations through a limited set of intermediate containers is not limited to the context of beverage production or even to transport of liquid materials. Coordination of movement of gases and solids, for example granular materials (e.g., grains), create similar issues.

A method of determining a route through an array of shared conduits is described in co-pending application Ser. No. 11/380,367, filed Apr. 26, 2006, and hereby incorporated by reference. The route may be used to control the electrically actuated valves to provide for an efficient transfer of materials.

SUMMARY OF THE INVENTION

The present invention provides a routing system that is sensitive to the types of materials being routed and that can modify the routing for a shared conduit system to allow selected reuse of some conduits for different materials. The invention may distinguish not only between materials but also between orders of materials allowing two materials to pass in a first sequence in a conduit while blocking the same two materials from passing through the conduit in a different sequence. In this way, more efficient use of the shared conduits may be had without cleaning of the conduits while preventing contamination between materials.

Specifically then, the present invention provides a computer-controlled material transport system for use for routing materials through a set of conduits joined by electrically controllable valves. The invention includes a routing system, designating a route through the conduit based on the need to transport a material from a source to a destination through the set of conduits, and a route controller. The route controller includes a valve controller receiving the route from the routing system and identifying valves to provide control signals to the electrically controllable valves to implement the route and a valve interlock locking implementation of the route based on a history of previous routes, indicating materials in the conduits, and based on a material compatibility array implementing rules about the mixing of materials.

Thus it is an object of at least one embodiment of the invention to provide a sophisticated route management system that may better re-use shared conduits for more efficient transportation of materials. Because compatible materials may be identified, all mixtures of materials need not be prohibited while still preventing undesired contamination of materials.

The valve interlock may receive a list of valves from the valve controller needed to implement the route and analyze the route based on the identified valves.

It is thus an object of at least one embodiment of the invention to provide a simple method for evaluating conduit reuse driven by the identification of individual valves.

The valves have an upstream and downstream side and the material compatibility array implements different rules for the same the materials depending on whether the materials are upstream or downstream.

Thus it is another object of at least one embodiment of the invention to provide for sophisticated reuse in situations where the order of the materials may affect their compatibility.

The materials include both product materials and cleaning materials the latter serving only to clean the conduits.

It is thus another object of at least one embodiment of the invention to manage the routing in the context not only of materials to be routed but cleaning solutions used for cleaning shared conduits.

The valve interlock may be implemented as a function block in a function block programming language for an industrial control system.

It is thus another object of at least one embodiment of the invention to provide a sophisticated routing system that may be readily implemented in custom designed programs by control engineers.

A clean pipe may be considered to be a material.

It is thus an object of at least one embodiment of the invention to provide a system that recognizes clean pipes that are compatible with all materials.

The route controller may provide a signal to the routing system when the implementation of a route is locked so that the routing system may designate a new, alternative route.

It is thus another object of at least one embodiment of the invention to provide a system that can re-route materials to efficiently accommodate material compatibilities.

These particular features and advantages may apply to only some embodiments falling within the claims and thus do not define the scope of the invention.

BRIEF DESCRIPTION OF THE DRAWINGS

FIG. 6 is a logical diagram of a material compatibility matrix used by the route master module of FIG. 5;

DETAILED DESCRIPTION OF THE PREFERRED EMBODIMENT

Figure 1:
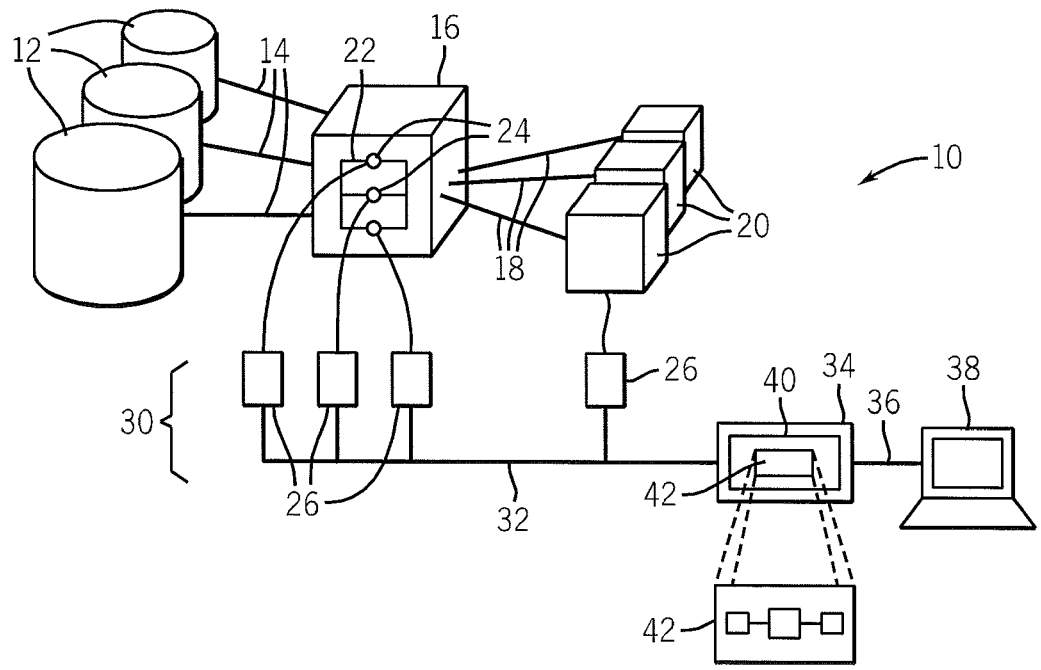
FIG. 1 is a block diagram of a shared conduit system joining material sources (e.g. storage tanks) to material destinations (e.g. filling stations) as controlled by an industrial controller executing a program according to the present invention.

Referring now to FIG. 1, a material transport system 10 may include material sources 12 communicating via primary conduits 14 with shared conduits 16. The shared conduits 16 may communicate, via secondary conduits 18, with material destinations 20. Such a system may be found, for example in a brewery, where the material sources 12 represent holding tanks for different types of beer and the material destinations 20 are bottle filling machines. Nevertheless the present invention is not limited to this particular application.

The shared conduits 16 may provide a number of pipes 22 passing in parallel between the material sources 12 and material destinations 20 as controlled by electrically actuated valves 24. In this example, the valves 24, control the passage of fluid in an on/off state; however, generally the term valve should be considered to embrace any control of passage of material between conduits.

The valves 24 receive signals from I/O modules 26 of an industrial control system 30, the latter which may communicate via a network 32 with a central programmable logic controller 34. The programmable logic controller 34 may communicate via the same or a different network 36 with a programming terminal 38 or other programmable logic controllers or equipment (not shown).

The programmable logic controller 34 incorporates a control program 40 typically prepared for a particular manufacturing operation and defining control of the valves 24 of the material transport system 10 as well as other components in the manufacturing process, for example the bottle filling machines 50 themselves. The present invention further provides a routing routine 42 that may work in context with the control program 40 to define routes through the shared conduits 16 based on the demands of the control program 40.

Typically the control program 40 will be written in a standard industrial control language to be readily modified according to the demands of the current manufacturing environment. Such standard industrial control languages include, for example, function block language, as will be described below, in which functional blocks are connected with virtual wires to provide for the programming of the system.

Figure 2:
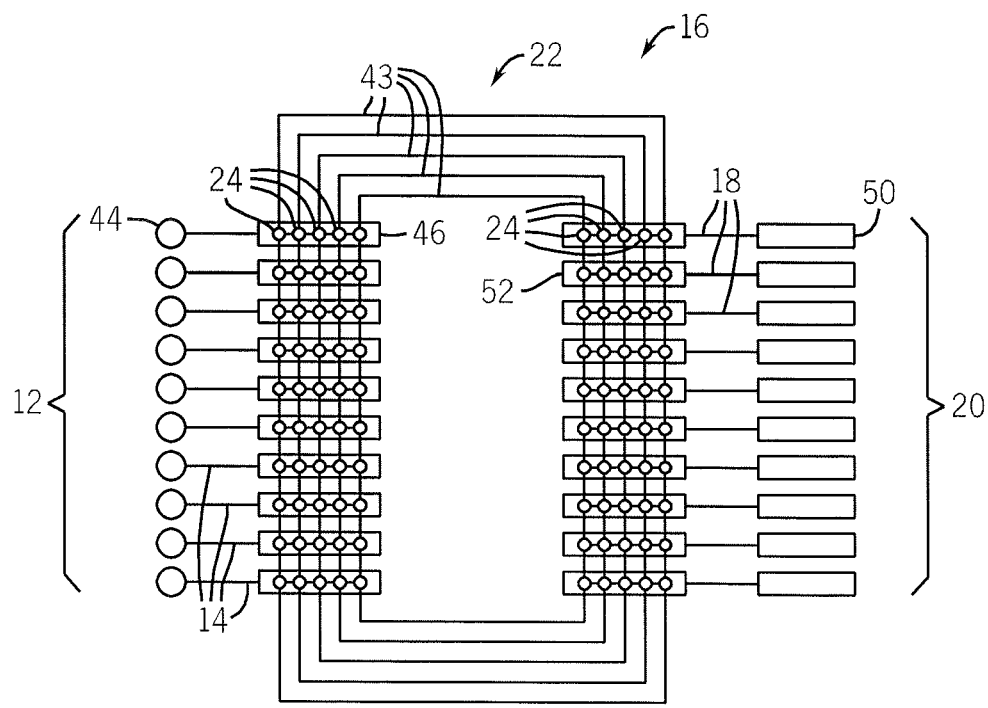
FIG. 2 is a schematic representation of one shared conduit system showing multi-valve manifolds communicating between the shared conduit system and each of the material sources and material destinations.

Referring now to FIG. 2, in one topology, the shared conduits 16 may consist of a set of loops 43 formed of pipes 22, shown for simplicity as concentric loops. Each material source 12, for example, a tank 44, may connect via a primary conduit 14 to a manifold 46 joining the primary conduits 14 to each of the pipes 22 of the individual loops 43. The manifold 46 provides at each juncture, between primary conduits 14 and pipes 22, a valve 48. In this way, by selectively opening one valve 48, a single path may be generated between, for example, tank 44 and the pipe 22 of one loop 43.

Conversely, each of the material destinations 20, for example, a bottle filling machine 50, may connect individually with pipes 22 of each of the loops 43 through a corresponding manifold 52 joined to the material destination 20 by secondary conduit 18. Again the junctions between each pipe 22 and the secondary conduit 18 are controlled by electrically actuated valves 24 so that selection and activation of one electrically actuated valve 24 in manifold 52 creates a path between any pipe 22 and an individual bottle filling machine 50.

Figure 3:
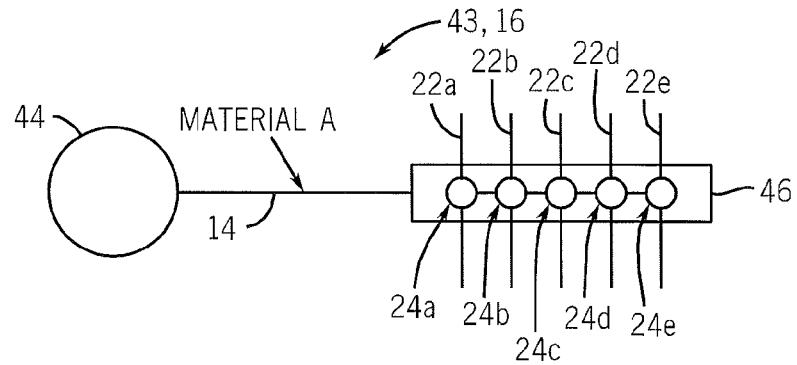
FIG. 3 is a detailed view of one manifold of FIG. 2 as it communicates with a material source showing a designation of upstream and downstream connection lines.

Referring now to FIG. 3, activation of a given valve, for example, electrically actuated valves 24b, will join dedicated primary conduit 14 to loop pipe 22b. For manifold 46, the material in primary conduit 14 will be considered "upstream material" and material in pipe 22b will be considered "downstream material".

Figure 4:
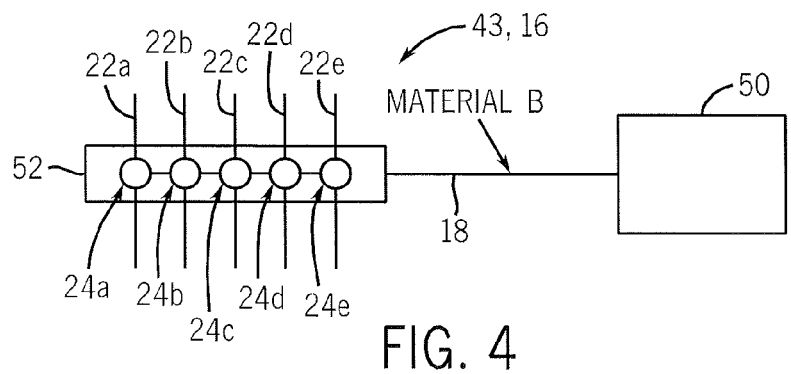
FIG. 4 is a figure similar to that of FIG. 3 showing the manifold communicating with a material destination.

Referring now to FIG. 4, conversely for manifold 52, a single valve, for example valve 24d, may connect pipe 22d to secondary conduit 18. In this case the material in pipe 22d will be considered to hold "upstream material" while the material in secondary conduit 18 will be considered to hold "downstream material".

Figure 5:
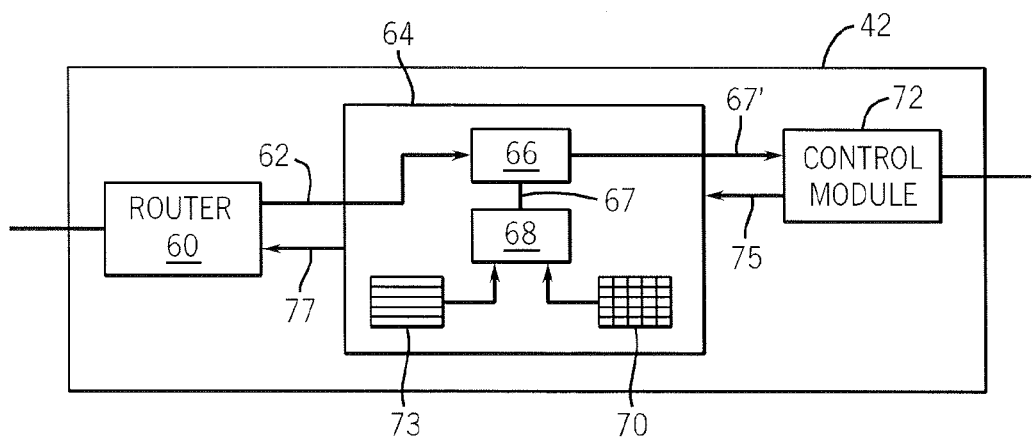
FIG. 5 is a detailed block diagram of the program of the present invention showing a router that communicates a route to a route master module of the present invention, the latter which may communicate with a control module controlling various valves.

Referring now to FIG. 5, the routing program 42 of the present invention includes a router 60 that, based on the need to move material from a material source 12 to material destinations 20 (as determined by the control program 40), determines one or more possible routes through the shared conduits 16. The determination of this routing system may be done as described in co-pending U.S. application Ser. No. 11/380,367, filed Apr. 26, 2006 referenced above or by other means, including manual actions or pre-programmed template routes invoked by the control program 40.

This route information 62 is then passed to a route master program 64 of the present invention. At the route master program 64, the route information 62 is provided to an equipment module 66 which determines the electrically actuated valves 24 which must be activated to implement the route of the route information 62. These valves 24 are identified by reviewing the primary conduits 14, secondary conduits 18, and shared conduits 16 designated by the route information 62 and identifying as the valves 24 to be actuated those valves 24 providing the interfaces between the identified conduits, typically under the constraint that only one valve 24 of each manifold 46 or 52 will be actuated at a time.

The identified valves 67 to be actuated are then provided to a route interlock program 68 of the present invention which determines whether those valves 24 to be actuated in fact may be actuated based on consideration of the particular materials that are upstream and downstream of each valve 24. By reducing the problem of material compatibility to a simple analysis of upstream and downstream materials, complex and arbitrary compatibility rules may be effected. These rules are held in the compatibility matrix 70 read by the route interlock program 68. The route interlock program 68 also reviews a flow history table 73 that provides ongoing information about upstream and downstream materials as will be described below.

Referring now to FIG. 6, the material compatibility matrix 70 provides for a set of rows and columns each identified to a particular material in the universe of materials held in material source 12. For example, these materials may include a "clean in place" material, such as a food safe detergent for cleaning the pipes as indicated by material (2), or particular product, such as a dark beer, as indicated by materials (3) through (6), or light beer, as indicated by materials (7) through (10). A virtual material (1) represents a clean pipe having no materials in it.

The material compatibility matrix 70 distinguishes between upstream materials, which are identified to columns as depicted, and downstream materials identified to the rows as depicted. In order for a particular identified valve 24 determined by equipment module 66 to be opened, the intersection of the appropriate row and column of the material compatibility matrix 70 is reviewed to determine a compatibility of the proposed mixing. This compatibility is indicated in FIG. 6 by the letter "Y". So, for example, if the downstream product is a clean pipe shown by row (1), any upstream material may be introduced into that pipe as is indicated by a full matrix row of Y's. In another example, if the downstream material is a cleaning material (2), then only a clean pipe (1) may be an upstream material, and no other actual product, such as beer, can be introduced into this detergent. Note that the material compatibility matrix 70 distinguishes not only the material but also the order of introduction of the material. Thus, for example, a light beer represented by column (9) may not be introduced into a conduit earlier having had a dark beer, as represented by row (4) whereas a dark beer represented by column (4) may be introduced into a conduit earlier having had a light beer as represented by row (9).

Referring again to FIG. 5, if the route is rejected by route interlock program 68, a signal 77 may be returned to the router 60 so that an alternative route may possibly be determined. Similarly, this may occur if a signal 75 is returned from the control module 72 indicating a failure of valve 24 or the like. In this way, the natural redundancy of the shared conduits 16 may be fully exploited.

Referring still to FIG. 5, only if the identified valves 67 provided by equipment module 66 are approved by route interlock program 68, will the equipment module 66 provide those identified valves 67' to the control module 72. The control module 72 provides an outputting of control signals to cause actuation of the desired valves 24. The router 60 and control module 72 operate together to allocate only pipes 22 that are not currently in use.

Figure 7:
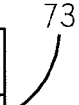
FIG. 7 is a logical diagram of a material history chart used by the route master module of FIG. 5.

Referring now to FIG. 7, the use of the compatibility matrix 70 by the route interlock program 68 requires an identification of upstream materials and downstream materials and thus an understanding of the historical path of materials through the shared pipes 22. This is provided by the flow history table 73 which lists each valve and the upstream material (material A) and downstream material (material B). For example, as shown in row one corresponding to valve one, an upstream material may be material (3) and downstream material may be material (5). This table may also store the state of the particular valve 24 indicating whether it should be blocked from opening "Y" or interlock with respect to these two materials as determined from the material compatibility matrix 70. For a manifold 46, the flow history table 73 will initially show upstream materials corresponding to the material in the material sources 12 and downstream materials corresponding to a clean pipe. Conversely for manifold 52, a flow history table 73 will initially show upstream materials corresponding to a clean pipe and downstream materials corresponding to a clean pipe. As materials are moved this flow history table 73 is updated. For example, when a valve is opened corresponding to row (4), the downstream material (2) will automatically be reset to be equal to upstream material (3). A flow history table 73 is provided for each manifold 46 and 52.

Figure 8:
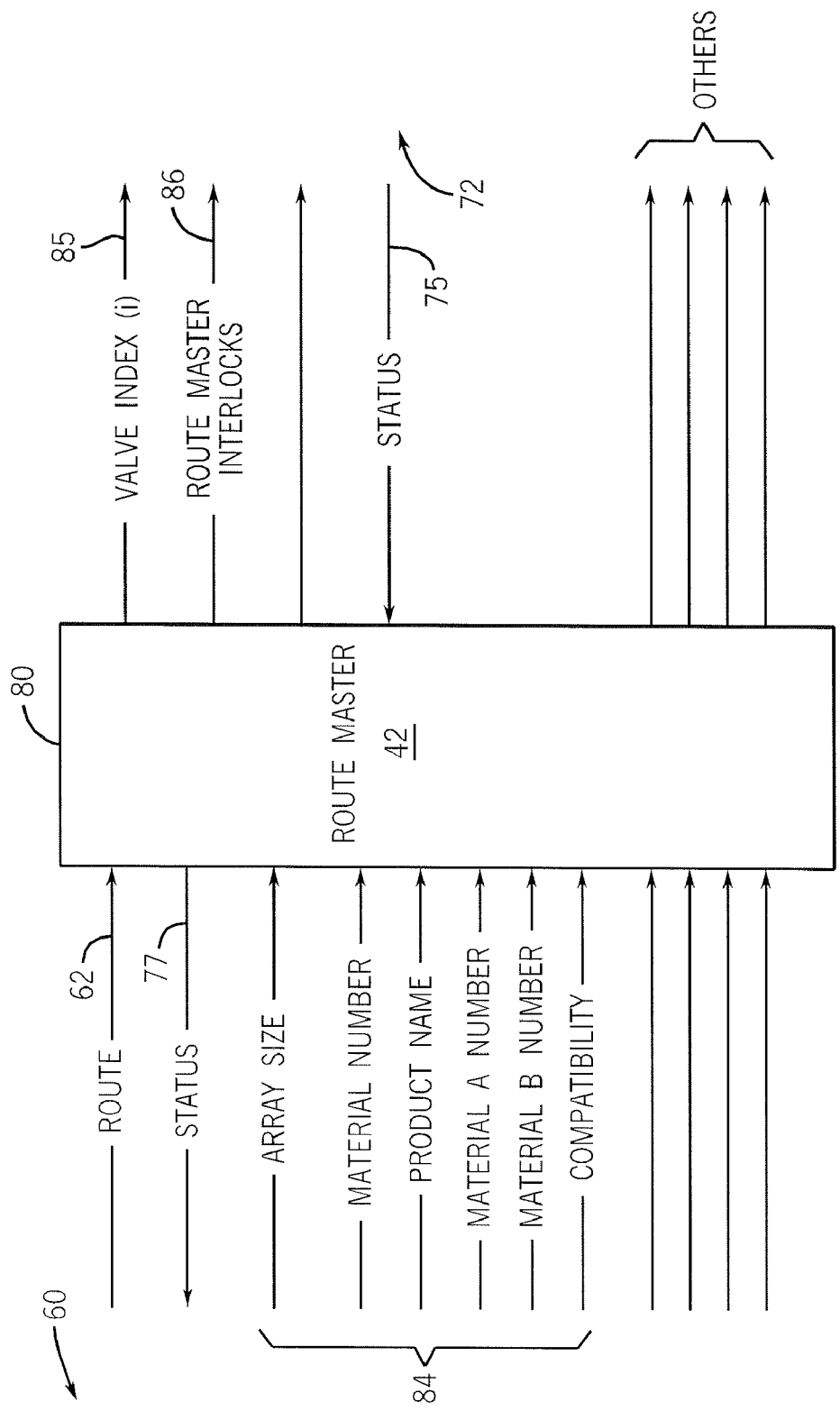
FIG. 8 is a functional block as may be used in a function block programming language incorporating the route master module of the present invention.

Referring now to FIG. 8, in a preferred embodiment, the routing program 42 of the present invention may be embodied in a function block 80 so as to be combined with other functional blocks of standard programming language to provide for this material sensitive routing capability. The function block 80 may receive route information 62 for receiving the route information from a router 60 (the latter implemented possibly as another functional block or as a set of custom programmed functional blocks) and return a status 82 indicating whether the route was in fact implemented. The values of compatibility matrix 70 and flow history table 73 may be provided by inputs 84 which provide for material names, material numbers and compatibility information (that is, each element of the compatibility matrix 70) for each combination of material A and material B. In this way, the information of the compatibility matrix 70 and flow history table 73 is invested into the function block 80.

The output of a function block 80 may be a list of the valve numbers 85 and their interlocked status sent to the control module 72. Status data 75 may be reported back from the control module 72 to indicate the status of the valves 24 as being actually opened or closed to help update the flow history table 73.

It is specifically intended that the present invention not be limited to the embodiments and illustrations contained herein and the claims should be understood to include modified forms of those embodiments including portions of the embodiments and combinations of elements of different embodiments as come within the scope of the following claims.

What is claimed is:

1. A computer-controlled material transport system for use for routing materials though a set of conduits joined by electrically controllable valves, the material transport system comprising:

a routing system designating a route though the conduit based on a need to transport a material from a source to a destination through the set of conduits;

a route controller including:

(1) a valve controller receiving the route from the routing system and identifying valves to provide control signals to the electrically controllable valves to implement the route;

(2) a valve interlock locking implementation of the route based on a history of previous routes indicating materials in the conduits, and based on a material compatibility array implementing rules about mixing materials.

2. The material transport system of claim 1 wherein the valve interlock receives a list of valves from the valve controller needed to implement the route and analyze the route based on the identified valves.

3. The material transport system of claim 1 wherein the valves have an upstream and downstream side and the material compatibility array implements different rules for same materials depending on whether the materials are upstream or downstream.

4. The material transport system of claim 1 wherein the materials include both product materials and cleaning materials, the latter serving only to clean the conduits.

5. The material transport system of claim 1 wherein the valve interlock is implemented as a function block in a function block programming language for an industrial control system.

6. The material transport system of claim 1 wherein the conduits provide multiple parallel paths between a plurality of material sources and a plurality of material destinations, and the electrically controllable valves may switch between each of the material sources and the multiple parallel paths, and the multiple parallel paths and each of the material destinations.

7. The material transport system of claim 1 wherein the conduits includes at least one of a pipe, a conduit, and a conveyor.

8. The material transport system of claim 1 wherein the material includes at least one of a liquid, a gas, and a solid.

9. The material transport system of claim 1 wherein a clean pipe is considered to be a material.

10. The material transport system of claim 1 wherein the route controller provides a signal to the routing system when the implementation of a route is locked so that the routing system may designate a new route.

11. In a computer-controlled material transport system for use for routing materials through a set of conduits between material sources and material destinations as joined by manifolds of electrically controllable valves according to routes designated by a routing system executing on an electronic computer, a route controller also executing on an electronic computer to:
   (1) receive a route from the routing system and identify valves and provide control signals to the electrically controllable valves to implement the route;
   (2) determine upstream and downstream materials in conduits to be joined by valves implementing the route;
   (3) analyze a compatibility matrix linking upstream and downstream materials according to pre-programmed compatibilities to determine whether the upstream and downstream materials may be joined by the opening of a valve;
   (4) when the compatibility matrix indicates that the materials may be joined, allow activation of the valves; and
   (5) when the compatibility matrix indicates that the materials may not be joined, block activation of the valves.

* * * * *